Nov. 30, 1948.                D. FIRTH                2,455,166
                            SHAFT BEARING
Filed Aug. 23, 1946                              2 Sheets-Sheet 1
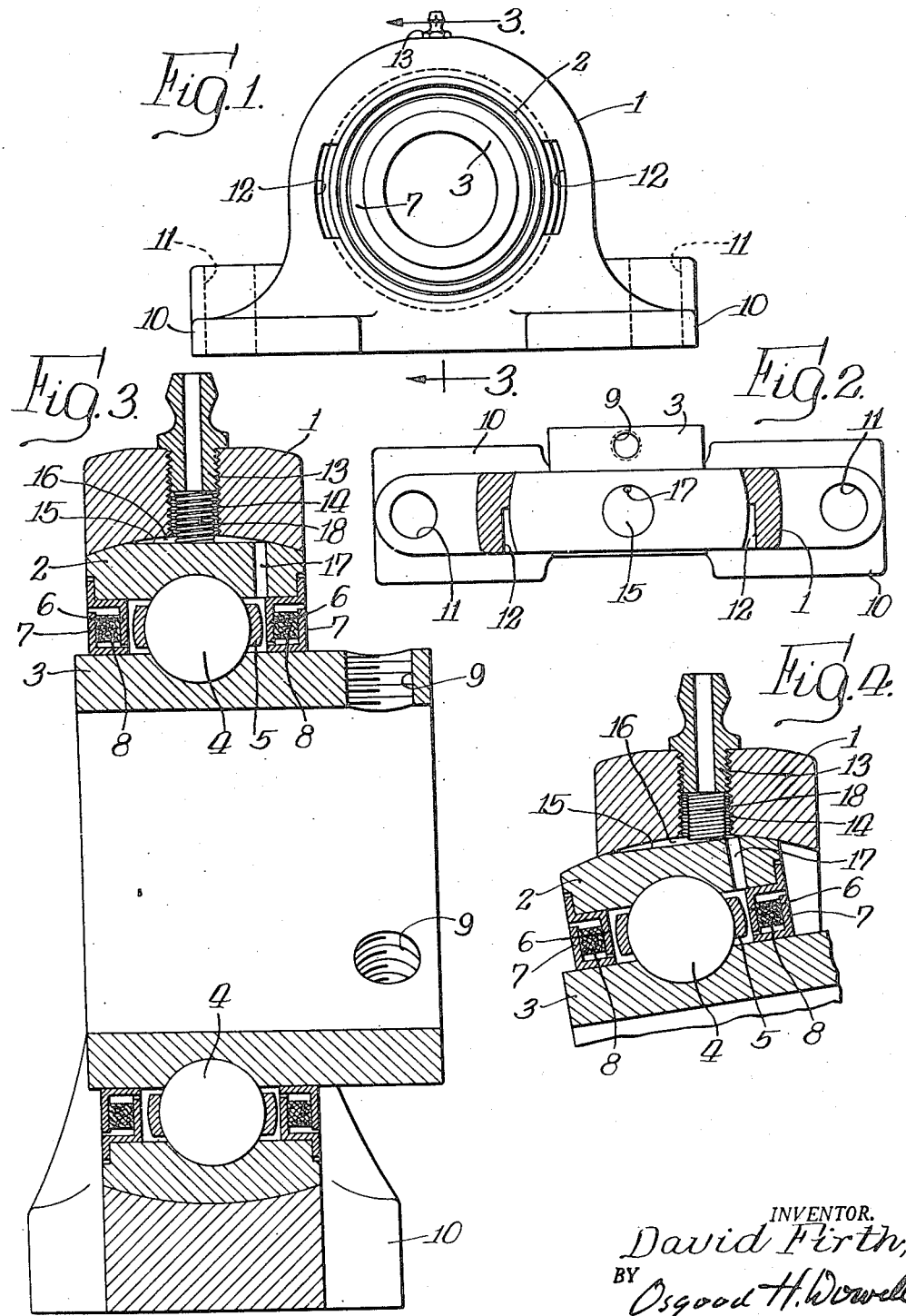
INVENTOR.
David Firth,
BY Osgood H. Dowell
         Atty.

Nov. 30, 1948.   D. FIRTH   2,455,166
SHAFT BEARING
Filed Aug. 23, 1946   2 Sheets-Sheet 2

INVENTOR.
David Firth,
BY Osgood H. Dowell
Atty.

Patented Nov. 30, 1948

2,455,166

UNITED STATES PATENT OFFICE 2,455,166

SHAFT BEARING

David Firth, South Bend, Ind., assignor to Dodge Manufacturing Corporation, Mishawaka, Ind., a corporation of Indiana Application August 23, 1946, Serial No. 692,599

11 Claims. (Cl. 308—187)

This invention pertains to a self-aligning antifriction shaft bearing comprising a sealed annular antifriction bearing unit having an exteriorly spherical outer race ring fitting an interiorly spherical housing encircling such race ring.

An object of the invention is the provision of practicable means comprising a motion-limiting lubricant-conducting connection between the housing and outer race ring, through which lubricant can be admitted to the interior of the sealed bearing unit, and embodying a spring for pressing the bearing unit against its seat, whereby to diminish or prevent rattle of the bearing unit in the housing and to obtain further advantage.

A shaft bearing of the type mentioned having such a connection embodying a spring for the purpose stated is disclosed by the present inventor in original application Serial No. 613,471, filed August 30, 1945, of which this application is a continuation in part, the part hereof divided from said original application being that which is based upon the structure shown in Figs. 1 to 4 of the accompanying drawings.

The invention embraces a number of species of distinctive individual characteristics, exemplified in the drawings.

Objects of the invention ancillary or subsidiary to that first stated or incident to different species thereof will be understood from the following description.

In the drawings:

Fig. 1 is a front elevation of an illustrative shaft bearing embodying a species of the invention.

Fig. 2 is a top plan view of the antifriction bearing unit mounted in the housing, the latter being shown in horizontal section with its base portion appearing in top elevation.

Fig. 3 is an enlarged longitudinal section of the illustrative shaft bearing taken on the line 3—3 of Fig. 1.

Fig. 4 is a partial longitudinal section of said shaft bearing showing the antifriction bearing unit in a tilted position in the housing.

Figure 5:
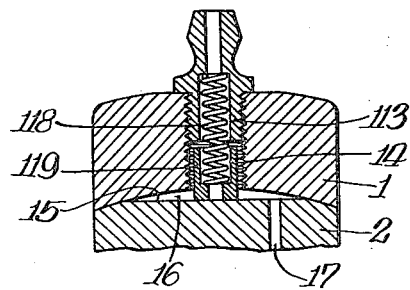
Figs. 5 and 6 are longitudinal sections of the upper part of a similar shaft bearing embodying another species of the invention, Fig. 5 partially showing the outer race ring when aligned and concentric with the housing, and Fig. 6 showing said race ring when the antifriction bearing unit is in a tilted relation to the housing.
Figure 6:
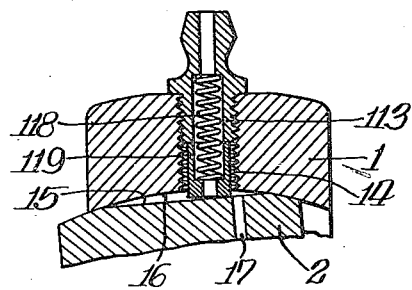
Figure 7:
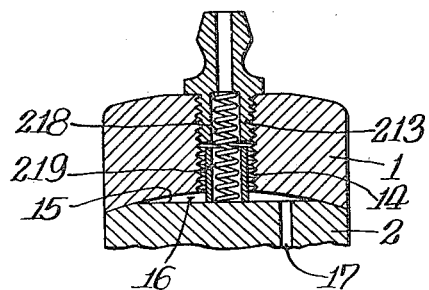
Figure 8:
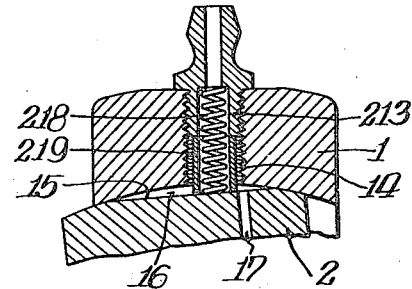

Figs. 7 and 8 are views corresponding to Figs. 5 and 6 showing a modified form of the type of structure disclosed in said Figs. 5 and 6.

Figure 9:
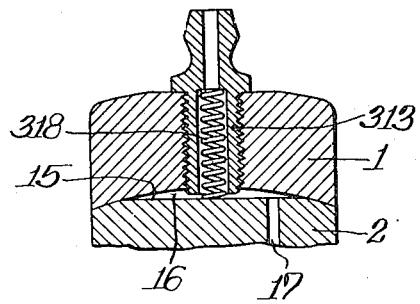
Figure 10:
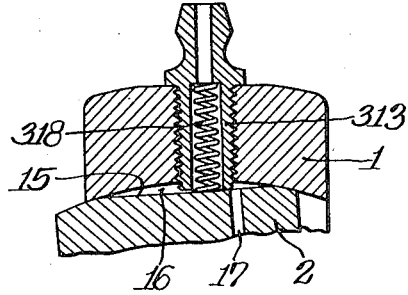

Figs. 9 and 10 are views corresponding to Figs. 5 and 6 showing still another species of the invention.

In all figures of the drawings, identical parts are designated by the same reference numerals.

Referring first to Figs. 1 to 4, the bearing housing I has mounted therein a sealed annular antifriction bearing unit whose outer race ring 2 has a spherical periphery fitting the interior spherical surface of the housing, so that the bearing unit can move universally about its spherical center to adapt itself to shaft alignment.

The antifriction bearing unit is shown as a ball bearing unit comprising said outer race ring 2, the inner race ring 3, and an interposed annular series of balls 4 running in confronting grooves in said race rings. A ball spacing device is indicated at 5 in Fig. 3. Seals for the bearing unit are provided by flanged sheet metal sealing rings 6 pressed in the outer race ring 2, sealing rings 7 pressed on the inner race ring 3, and interposed washers or packings 8 of felt or the like.

The inner race ring 3, which is to be mounted on and fixed to the shaft to which the bearing is to be applied, is shown as elongated and bored to fit the shaft and having its extension provided with threaded holes 9 for engagement by set screws for attaching said inner race ring to the shaft. If preferred, the inner race ring could be fastened to the shaft by means of a collar (not shown) fitted on said extension, and set screws threaded in the collar and passing loosely through said holes 9 and screwed against the shaft, as disclosed in said application Serial No. 613,471.

The housing I is shown as a one-piece strap-type housing having a base portion formed with extensions 10 and provided with holes 11 for bolts or screws for attaching it to a support. The interior spherical surface of the housing is cut by confronting longitudinal grooves 12 to permit introducing the bearing unit into the housing. As will be understood by those familiar with the art, the bearing unit when held with its axis vertical can be inserted through the slots 12 to a position in which the outer race ring of said unit is clear of said slots and wholly within the geometric sphere coincident with the interior spherical surface of the housing, whereupon said unit can be tilted through an angle of 90 degrees into seated and erect position in the housing.

A fitting through which to introduce lubricant to the bearing is provided by a radially disposed tubular screw plug 13 screwed into a tapered hole or bore 14 extending through the upper part of the housing wall. This fitting or lubricant screw may be located at the top of the housing or at either side thereof, provided that it must be a suitable distance above the slots 12 for the purpose hereinafter indicated. The lubricant screw is screwed into the housing as far as it can go, thus drawing its enlarged head tight against a seat therefor formed on the exterior of the housing. In this instance the lubricant screw has a short shank which extends only part way through the housing wall.

The outer race ring 2 of the ball bearing unit has its spherical periphery slightly truncated to form a circular flat surface 15 centered at the middle of said race ring and of a diameter less than the width of the spherical zone represented by said periphery. The ball bearing unit is so arranged in the housing as to present said flat surface under or opposite the lubricant screw 13. The lubricant screw is so located that said flat surface 15 can be centered therewith, as shown in Fig. 3, when the bearing unit is aligned with the housing.

The interior spherical surface of the housing around the screw hole 14 confronts said flat surface 15 and extends all around it in sliding contact with the spherical surface of the outer race ring 2. A closed lubricant space or chamber 16, into which lubricant can be introduced through the screw 13, is thus provided between said flat surface 15 and the confronting interior surface of the upper part of the housing. This space or chamber 16 communicates with the interior of the sealed ball bearing unit through a duct 17 which may be drilled from said flat surface straight through the outer race ring at one side of the ball race therein.

Loosely fitting in the screw hole 14 is a coiled spring 18 compressed between the lubricant screw and flat surface 15 and which by its pressure against said flat surface tends to hold the bearing unit firmly seated and to prevent hammering thereof in the housing in case of a loose fit thereof in the housing.

The spring 18 also serves as a means through which the lubricant screw 13 coacts with said flat surface 15 to limit universal movement of the bearing unit and rotative movement of the outer race ring. When said flat surface is normal to and concentric with the lubricant screw, as shown in Fig. 3, a slight clearance exists between the coils of the spring. As said flat surface is swung from the position shown in Fig. 3 by angular movement of the bearing unit, or by rotative movement of the outer race ring on its own axis said flat surface rides under and lifts the lower end of the spring by camming action, in the manner shown in Fig. 4, thus contracting the spring. When the coils are forced together, the spring acts much like a solid pin between 13 and 15 to prevent further movement.

Fig. 4 shows the bearing unit in the extreme position to which it can be tilted on an axis perpendicular to the plane of the drawing. In like manner limitation is imposed on all movements of the bearing unit except on an axis normal to the plane of the flat surface 15 or other axes intersecting said flat surface about which it would rotate with wobbling motion but without effecting full compression of the spring. In short, the center of the flat surface 15 cannot be moved more than a certain distance from the center of the lubricant screw.

The angular distance through which the bearing unit can move universally or on all axes, and through which the outer race ring can turn on its own axis, is therefore dependent in this instance upon the degree of contractibility of the spring 18 when the parts of the illustrative structure are in the relationship shown in Fig. 3. It will be noted that the spring cannot be fully compressed into the screw hole 14. So long as the lubricant screw 13 is in place and screwed home, there can be no derangement by displacement of the spring to an inoperative position between the lubricant screw and spherical surface of the outer race ring 2.

The clearance existing between the coils of the spring 18 when the structure is in the condition shown in Fig. 3 is sufficient to allow ample universal movement of the ball bearing unit to adapt itself to shaft alignment, but is insufficient to permit movement of said unit or the outer race ring thereof to a position to expose said flat surface 15 or any part of its margin. In every position which the bearing unit or its outer race ring can assume, said flat surface is covered by the housing and completely encircled by contacting spherical surface of the housing and said race ring, and in every such position lubricant can pass from the screw 13 to the closed lubricant space or chamber 16 through the spring or between its coils. A lubricant-conducting passage through and from the lubricant fitting to the interior of the sealed bearing unit is thus maintained under all conditions.

The bearing unit of the illustrative structure can be turned round about in the housing by rotation on an axis normal to the flat surface 15 or other axis close to such normal axis. By centering said flat surface at the so-called great circle of the outer race ring, i. e. the circle of its greatest diameter in a plane perpendicular to its axis, and by correspondingly centering the lubricant screw 13 at the plane perpendicular to the housing axis in which the spherical bore of the housing is of greatest diameter, the position of the bearing unit can be reversed in the housing without impairing its alignment therewith or the concentric relation of the lubricant screw and flat surface. That is to say, whether the bearing unit be arranged with the extension of its inner race ring projecting from one end or the other of the housing, said unit can be aligned with the housing while maintaining said flat surface centered with the lubricant screw as in Fig. 3.

In the illustrative structure, utilizing a one-piece strap-type housing interiorly slotted to permit introducing the bearing unit thereinto, the described lubricant-conducting motion-limiting connection provided between the housing and outer race ring effects locking of the bearing unit in the housing, preventing it from assuming a position to allow its withdrawal from the housing, so long as the lubricant screw is in place and screwed home. Further said connection prevents creeping of the outer race ring 2 by rotation with or in the direction of rotation of the shaft when the bearing is in use for supporting a shaft.

The grease hole 17 in the outer race ring, though preferably located with its outer end in the flat surface 15, might under some conditions be otherwise arranged, e. g. at a position angularly spaced from that shown in Fig. 2, with its outer end in the spherical surface of said ring close to said flat surface and in communication with the lubricant space 16 through a short slot or notch cutting into said flat surface, provided the hole be well within the housing in all positions assumable by the ball bearing unit for self-alignment with the shaft.

Reference will now be made to Figs. 5 to 10. The structures represented in these figures are broadly similar to and have the same capabilities as that first described, but involve a common distinction therefrom in that, in each of the structures of Figs. 5 to 10, the spring utilized for pressing the bearing unit against its seat in the housing is relieved from the duty of motion limitation, which is accomplished by coaction of the lubricant screw with the flat surface 15 indirectly through an interposed thrust pin in Figs. 5 to 8 and directly in Figs. 9 and 10.

In Figs. 5 and 6 the bearing unit is spring-pressed against its seat in the housing by the expansible coiled spring 118 whose lower end is s .ted in a cup-type pin 119 loosely slidably fitted .n the screw hole 14, the spring thus acting indirectly against the flat surface 15. The lubricant screw 113 is shown counterbored to contain a portion of the spring and to provide a shoulder therein against which the upper end of the spring bears. This permits the use of a relatively long coiled spring suitably confined, and the cup-type pin 119 provides a relatively large wear surface for contact with the flat surface 15. The lubricant screw 113 coacts with the flat surface 15 through the interposed pin 119 for motion limitation. When said flat surface is centered with the lubricant screw as in Fig. 5, a clearance exists between the upper end of the pin 119 and inner end of the lubricant screw. As said flat surface is swung away from the position shown in Fig. 5, either by angular movement of the bearing unit or by rotative movement of the outer race-ring 2 on its own axis, said flat surface 15 operates cammingly against and lifts the pin 119, as shown for example in Fig. 6, and upon contact of said pin with the lubricant screw the movement is arrested. The clearance between 113 and 119 in Fig. 5 is sufficient to allow ample universal movement of the bearing unit for self-adjustment to suit the shaft alignment, but is insufficient to prevent opening of the lubricant space 16 or exposure of the margin of the flat surface 15 in any position which the bearing unit or its outer race ring can assure. Under all conditions lubricant can pass to the space 16 through or around the pin 119, which is shown having a grease outlet in its bottom, in lieu of which the upper end of the pin could be notched to permit passage of grease around it when the pin is pressed up against the lubricant screw as shown in Fig. 6.

A structure of the type exemplified by Figs. 5 and 6 but employing the lubricant screw 13 of Figs. 3 and 4 and a shorter spring reacting against the inner end of said screw and seated in the cup-type pin 119, or a structure of said type employing the counterbored lubricant screw 113 and a shorter spring contained therein and acting against a solid or boreless pin substituted for 119, such solid pin being loosely fitted in the screw hole and suitably formed to allow passage of lubricant around it under all conditions, would be within the scope of the invention, though less desirable than the specific structure of Figs. 5 and 6.

Figs. 7 and 8 illustrate a modified structure wherein the lubricant screw 213 coacts with the flat surface 15 for motion limitation through an interposed tubular pin 219, and the spring 218 for pressing the bearing unit against its seat in the housing extends loosely through said pin and bears directly against 15; motion being limited in this instance in the same manner and with the same effect as in the structure of Figs. 5 and 6, and lubricant passing to the space 16 through or around the hollow pin under all conditions.

In Figs. 9 and 10, the long-shanked counterbored lubricant screw 313 extends through the housing wall and protrudes slightly into the lubricant space 16 and coacts directly with the flat surface 15 for motion limitation, while the spring 318 contained in the screw bears directly against said flat surface for pressing the bearing unit against its seat in the housing. When said flat surface is normal to and concentric with the lubricant screw, as in Fig. 9, a clearance exists between the inner end and said flat surface. As the latter is swung away from the position shown in Fig. 9, by angular movement of the bearing unit or rotative movement of the outer race ring on its own axis, the clearance is gradually taken up until the flat surface abuts the inner end of the screw and stops the movement as indicated in Fig. 10. As in the other cases, the clearance existing in the condition of the structure shown in Fig. 9 is sufficient for necessary universal movement of the bearing unit, but insufficient to allow exposure of the flat surface 15 or any part of its margin in any position which the bearing unit or its outer race ring can assume.

Each of the disclosed structures provides a highly practicable and advantageous lubricant-conducting motion-limiting connection between the housing and outer race ring, whereby to lock the bearing unit in the housing with capacity for a limited universal movement thereof and to prevent creeping of the outer race ring when the bearing is in use, while permitting introduction of lubricant through such connection to the interior of the sealed bearing unit under all conditions, and embodies in such connection a spring which by its pressure against the bearing unit tends to hold it firmly seated, minimizing or preventing rattle of the bearing unit in the housing and also imposing a resistance to movement thereof, as is desirable in case of either a loose fit or an unduly free slip fit of the bearing unit in the housing.

In a shaft bearing of the type to which the invention relates, a close slip fit of the bearing unit in the housing is desirable, but difficult to obtain otherwise than accidentally because it would require accurately machining the interior surface of the housing and exterior surface of the race ring to precise diametric dimensions. In ordinary practice, these surfaces are usually machined to provide between them a theoretical clearance of say from one thousandths to two or three thousandths of an inch, depending upon variations tolerated. Now in some cases, with a theoretical clearance of say two or three thousandths of an inch between said surfaces, the bearing unit may nevertheless have or seem to have a snug fit in the housing, due to deviation of the interior surface of the latter from perfect roundness and a consequent tight fit of the outer race ring in the housing with three point contact therewith. This may result from causes incident to machining, as where the housing is bolted down on an uneven support while being machined and thereafter springs out of perfect roundness, or where heat generated in machining with a boring tool which has become somewhat dull may result in uneven expansion and contraction of the interior surface of the housing and consequent slight distortion. On the other hand, if the bearing is so perfectly made that the interior surface of the housing and exterior surface of the outer race ring are truly spherical, as is desirable, then a clearance between them of as much as two thousandths of an inch would result in a loose fit, and even a slight clearance of say only a thousandth of an inch may allow such free movement of the bearing unit in the housing as to convey an impression of looseness, which is undesirable. These difficulties are obviated by the present invention wherein the spring pressing against the bearing unit not only prevents or diminishes rattle thereof in the housing but also imposes a desired resistance to movement thereof in case of either a loose fit or an unduly free slip fit of the bearing unit in the housing.

Notice is given that my said application Serial No. 613,471 copending herewith discloses and claims certain structures not incorporating a spring for pressing the bearing unit to its seat but otherwise substantially similar one to the structures shown in Figs. 5-6 and 7-8 hereof and another to the structure shown in Figs. 9 and 10 hereof, and that each of the structures shown in said figures embodies subject-matter not claimed herein but disclosed and claimed in my said copending application.

I claim:

1. In a self-aligning shaft bearing comprising a sealed annular antifriction bearing unit having an exteriorly spherical outer race ring and an interiorly spherical housing in which it fits, a lubricant-conducting motion-limiting connection between said housing and race ring embodying means for resiliently pressing said unit against its seat in the housing, through which connection lubricant can be introduced to the interior of said unit in any position which it can assume.

2. A self-aligning shaft bearing comprising a sealed annular antifriction bearing unit having an exteriorly spherical outer race ring, an interiorly spherical housing in which said race ring fits, and means in the upper part of the housing wall coacting with said race ring for limiting universal movement of said unit and embodying a spring arranged for pressing said unit against its seat in the housing, there being a closed lubricant space between said wall and race ring and a duct in said ring through which said space communicates with the interior of said unit, to which space lubricant can be conducted through said means.

3. A self-aligning shaft bearing comprising a sealed annular antifriction bearing unit whose outer race ring has a spherical periphery with a truncated portion forming a flat surface, an interiorly spherical housing in which said race ring fits and in whose upper part said flat surface is disposed, said flat surface being encircled by contacting spherical surfaces of said housing and race ring and the space between said flat surface and housing being in communication with the interior of said unit through a duct in said ring, a fitting fixed in the housing wall opposite said flat surface coacting therewith for limiting universal movement of said unit and through which lubricant can be introduced to said space, and an expansible spring acting between said fitting and flat surface for pressing said unit against its seat in the housing.

4. A self-aligning shaft bearing comprising a sealed annular antifriction bearing unit whose outer race ring has a spherical periphery with a truncated portion forming a flat surface, an interiorly spherical housing in which said race ring fits and in whose upper part said flat surface is disposed, said flat surface being encircled by contacting spherical surfaces of said housing and race ring and the space between said flat surface and housing being in communication with the interior of said unit through a duct in said ring, a fitting fixed in the housing wall opposite said flat surface through which lubricant can be introduced to said space, and a spring compressed between said fitting and flat surface through which said fitting coacts with said flat surface for limiting universal movement of said unit and which presses said unit against its seat in the housing.

5. A self-aligning shaft bearing comprising a sealed annular antifriction bearing unit whose outer race ring has a spherical periphery with a truncated portion forming a flat surface, an interiorly spherical housing in which said race ring fits, a fitting removably fixed in the housing wall opposite to which said flat surface is presented and through which lubricant can be introduced into the space between said flat surface and confronting interior surface of the housing, said ring having a lubricant passage extending from said flat surface and through the ring to the interior of the sealed unit, and stop means associated with said fitting and with which said flat surface is coactive for limiting universal movement of said unit, said stop means comprising a resilient element compressible between said fitting and flat surface, said flat surface and the part of said passage in the periphery of said ring being covered by the housing and completely encircled by contacting spherical surfaces of said ring and housing in all positions which the unit can assume.

6. A self-aligning shaft bearing comprising a sealed annular antifriction bearing unit whose outer race ring has a spherical periphery with a truncated portion forming a flat surface, an interiorly spherical housing in which said race ring fits, said housing having a bore extending through an upper part of its wall and said unit being arranged to present said flat surface opposite said bore, a fitting removably fixed in said bore through which lubricant can be introduced into the space between said flat surface and the confronting interior spherical surface of the housing, said fitting extending only part way into said bore, and an expansible coiled spring loosely fitted in said bore for limiting universal movement of said unit and pressing it against its seat in the housing, said ring having a lubricant passage leading from said flat surface and through the ring to the interior of the sealed unit, said flat surface and the part of said passage in the periphery of said ring being covered by the housing and completely encircled by contacting spherical surfaces of said ring and housing in all positions which the bearing unit can assume.

7. A self-aligning shaft bearing comprising a sealed annular antifriction bearing unit whose outer race ring has a spherical periphery with a truncated portion forming a flat surface, an interiorly spherical housing in which said race ring fits, a fitting removably fixed in the housing wall opposite to which said flat surface is presented and through which lubricant can be introduced into the space between said flat surface and confronting interior surface of the housing, a radially movable element resting against said flat surface and whose outward movement is limited by said fitting for limiting the universal movement of said unit, said element being formed to allow passage of lubricant past it from said fitting to said space, and an expansible coiled spring interfitted with said element and acting between said fitting and flat surface for pressing said unit against its seat in the housing, said ring having a lubricant passage extending from said flat surface and through said ring to the interior of said unit, said flat surface and the portion of said last named passage in the periphery of said ring being covered by the housing and completely encircled by contacting spherical surfaces of said ring and housing in all positions which the bearing unit can assume.

8. A self-aligning shaft bearing according to claim 7 wherein said element is a cup-type pin in which the inner end of said spring is seated.

9. A self-aligning shaft bearing according to claim 7 wherein said element is a tubular pin through which said spring extends.

10. A self-aligning shaft bearing comprising a sealed annular antifriction bearing unit whose outer race ring has a spherical periphery with a truncated portion forming a flat surface, an interiorly spherical housing in which said race ring fits, said housing having a bore extending through an upper part of its wall and said unit being arranged to present said flat surface opposite said bore, a fitting removably fixed in said bore through which lubricant can be introduced into the space between said flat surface and the confronting interior spherical surface of the housing, said fitting extending only part way into said bore, a pin slidably fitted in said bore resting on said flat surface and liftable thereby into contact with said fitting for limiting the universal movement of said unit, and a spring associated with said pin for pressing said unit against its seat in the housing, said pin being formed to permit passage of lubricant through or around it, said ring having a lubricant passage extending from said flat surface and through the ring to the interior of the sealed unit, said flat surface and the part of said last named passage in the periphery of said ring being covered by the housing and completely encircled by contacting spherical surfaces of said ring and housing in all positions which said unit can assume.

11. A self-aligning shaft bearing comprising a sealed annular antifriction bearing unit whose outer race ring has a spherical periphery with a truncated portion forming a flat surface, an interiorly spherical housing in which said ring fits, said flat surface being disposed in the upper part of the housing, a fitting removably fixed in the upper part of the housing wall through which lubricant can be introduced to the space between said flat surface and the housing, said fitting comprising a counterbored tubular screw the inner end of which protrudes into said space and coacts with said flat surface for limiting universal movement of said unit, and an expansible coiled spring contained in said screw and bearing against said flat surface for pressing said unit against the seat in the housing, said ring having a lubricant passage extending from said flat surface and through said ring to the interior of the sealed unit, said flat surface and the part of said passage in the periphery of said ring being covered by the housing and completely encircled by contacting spherical surfaces of said ring and housing in all positions which the bearing unit can assume.

DAVID FIRTH.

REFERENCES CITED

The following references are of record in the file of this patent:

UNITED STATES PATENTS

| Number | Name | Date |
| --- | --- | --- |
| 1,643,720 | McKone | Sept. 27, 1927 |
| 2,194,328 | Shafer | Mar. 19, 1940 |